United States Patent
Curry

(10) Patent No.: US 7,693,285 B2
(45) Date of Patent: Apr. 6, 2010

(54) SECURE COMMUNICATION APPARATUS AND METHOD

(75) Inventor: Ian Curry, Kanata (CA)

(73) Assignee: Entrust, Inc., Dallas, TX (US)

( * ) Notice: Subject to any disclaimer, the term of this patent is extended or adjusted under 35 U.S.C. 154(b) by 989 days.

(21) Appl. No.: 10/092,277

(22) Filed: Mar. 6, 2002

(65) Prior Publication Data

US 2003/0172262 A1    Sep. 11, 2003

(51) Int. Cl.
*H04L 9/08* (2006.01)
*H04L 9/00* (2006.01)

(52) U.S. Cl. .............. 380/281; 380/282; 380/278; 713/150

(58) Field of Classification Search .................. None
See application file for complete search history.

(56) References Cited

U.S. PATENT DOCUMENTS

| | | | | |
|---|---|---|---|---|
| 5,832,208 A | * | 11/1998 | Chen et al. | 726/24 |
| 5,991,399 A | * | 11/1999 | Graunke et al. | 380/279 |
| 6,061,448 A | | 5/2000 | Smith et al. | |
| 6,912,285 B2 | * | 6/2005 | Jevans | 380/284 |
| 6,912,656 B1 | * | 6/2005 | Perlman et al. | 713/170 |
| 7,284,067 B2 | * | 10/2007 | Leigh | 709/238 |
| 2002/0091928 A1 | * | 7/2002 | Bouchard et al. | 713/178 |
| 2002/0116606 A1 | * | 8/2002 | Gehring | 713/153 |
| 2003/0007645 A1 | * | 1/2003 | Ofir | 380/282 |
| 2004/0205248 A1 | * | 10/2004 | Little et al. | 709/246 |

OTHER PUBLICATIONS

"IEEE 100, The Authoritative Dictionary of IEEE Standards Terms, Seventh Edition", copyright 2000, p. 872.*

* cited by examiner

*Primary Examiner*—Ponnoreay Pich
(74) *Attorney, Agent, or Firm*—Vedder Price P.C.

(57) ABSTRACT

A method and apparatus, such as a secure distribution server, receives encrypted information from a sender, wherein the encrypted information is for transmission to a plurality of intended recipients. In addition to the encrypted information, the method includes receiving an encrypted secret key that is encrypted using a public key associated with the secure distribution server. The method and apparatus decrypts the encrypted secret key to produce a decrypted secret key. The method and apparatus then encrypts the decrypted secret key with the corresponding public key of at least one (or each of a plurality of) intended recipient(s) to produce at least one (or plurality of) recipient-specific secure secret keys. The method and apparatus then forwards the received encrypted information sent by the sender and also sends at least one recipient-specific secure secret key to a corresponding intended recipient.

27 Claims, 3 Drawing Sheets

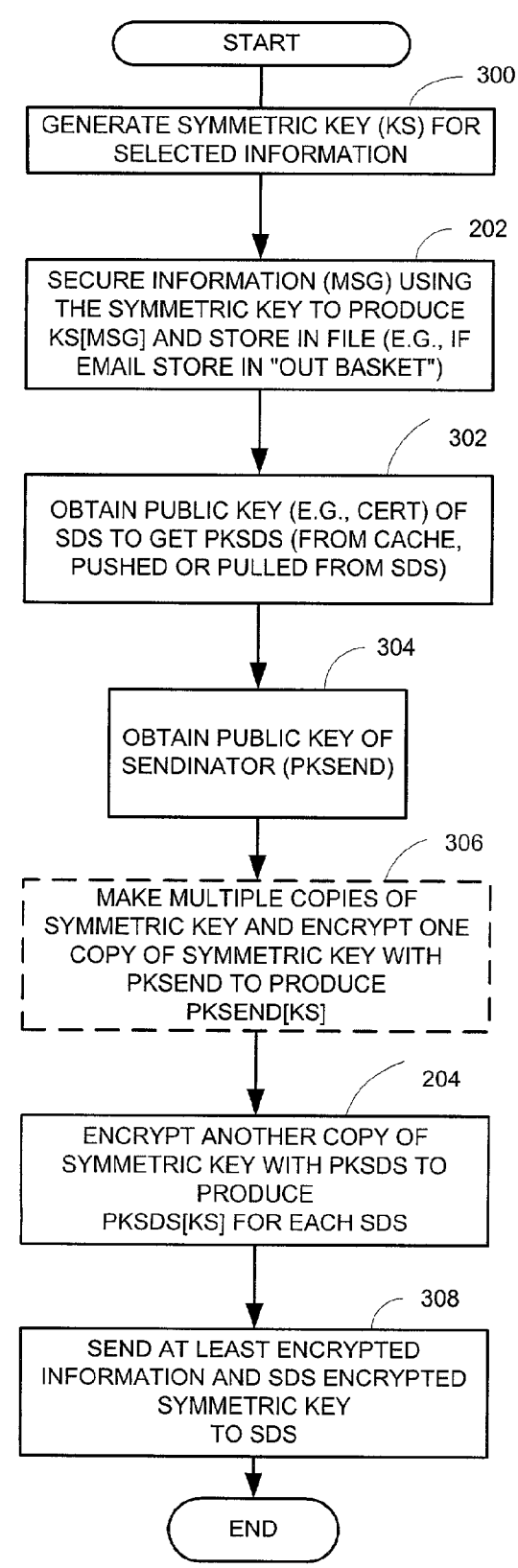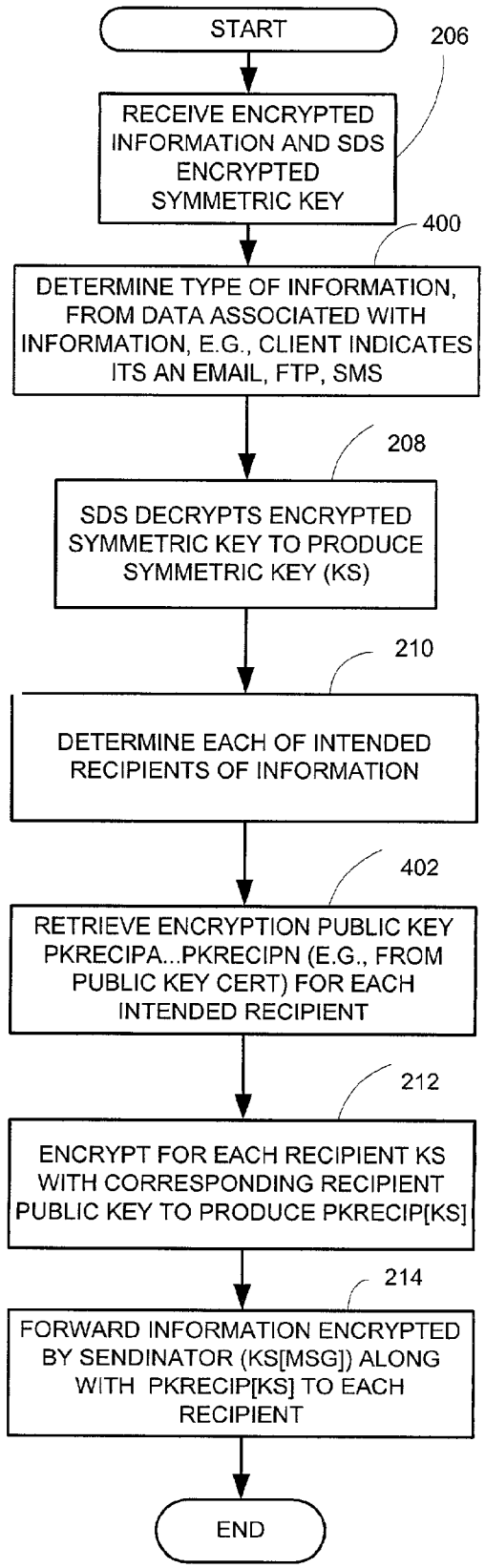
FIG. 3
FIG. 4

SECURE COMMUNICATION APPARATUS AND METHOD

BACKGROUND OF THE INVENTION

The invention relates generally to secure communication systems and methods and more particularly to secure communication systems and methods employing secure network elements such as servers.

Secure information systems are known which employ, for example, secure e-mail servers. For example, public key-based encryption systems may employ a secure server that performs the encryption of the information, such as encrypting an e-mail or other collection of information after it is received by a sending unit, such as a wireless or non-wireless PDA, internet appliance, telephone, laptop computer, desktop computer or any other mobile or non-mobile device. In such systems, the secure server encrypts the information using a secret key, such as a symmetric key generated by the secure server. In order to decrypt the document, an intended recipient also needs the secret key. Therefore, the secure server retrieves a public key of an encryption key pair associated with the intended recipient and encrypts the secret key with the public key of the recipient and forwards the encrypted information and the encrypted secret key to the recipient on behalf of the sender. However, with such systems, the secure server typically must encrypt the information. This can result in an insecure system since the information desired to be encrypted is encrypted only after it is sent to the server. Alternatively, in other prior art systems, the message information is encrypted by the sender, and then decrypted by the server and re-encrypted by the server for transmission to the intended recipients. Requiring the server to perform the bulk encryption of the message information adds additional processing requirements on the server.

In yet another type of secure information system, a sending unit retains the public key certificates of each of the intended recipients in a local cache or obtains them from a lightweight directory access protocol (LDAP) server, from a public key certificate directory such as an X.500 type directory, or other suitable certificate source. Obtaining each of the recipient public key certificates by the sending unit can require significant complexity and significant processing capabilities. For example, where a sending unit (sender) wishes to send a large message having many recipients, the public key for each of the recipients must be located by some manner. This can require many time consuming retrievals by the sending unit. Moreover, this is typically done on a real time basis with larger messages thus requiring the sender to perform the encryption during an on line session. The overhead and processing requirements can be burdensome and significantly reduce the performance of certain types of senders such as hand held devices, for example, that typically have limited amounts of processing capability and limited bandwidth connections to a network.

Moreover, for personal trust relationships, such as those where the sender and recipient are not in the same community of trust, meaning that they do not share the same certificate authority (CA), or belong to certificate authorities that are cross certified as trusting one another or that do not share a common root certificate of a trust authority embedded in a browser or other suitable application, the sender and recipient require a copy of the public key certificates through another mechanism. A problem with personal trust relationships is that sending units must typically manage them themselves and there is no secure way to readily share external user's certificates across a broad set of internal sending units. A difficulty is that external user certificates cannot be validated using CA signatures because the certificate is not cross certified to the internal sending unit's CA (or user's CA). When there is no ability to verify the signature on a certificate, user devices are forced to store keys locally (as opposed to in a public directory).

Also, it would be desirable to improve deployment capabilities in systems that have many sending units. For example, having smaller sending unit cryptographic software modules to enable suitable secure information sessions would be desirable.

Another secure information system requires the sender to encrypt a document or other information using a secret key and then the sender contact the secure server to have the secure server obtain a public key associated with an intended recipient. The secure server retrieves the public key in real time from a certificate authority and transmits the public key back to the sender. The sender encrypts the secret key with the public key and transmits the encrypted document and the encrypted secret key to the secure server for transmission to the recipient. However, such a system requires dialog back and forth between the sending unit and the secure server and the sending of the public keys back during an on line connection when the document is being encrypted. Therefore, off line secure communication is not readily facilitated. For example, where the sending unit is a portable unit and the user is not connected with the secure server (for example, while the user is in an aircraft), it would be desirable to allow the sending unit to perform at least portions of the encryption process. In addition, such systems require the sending unit to encrypt a copy of the symmetric key for each of the intended recipients. Since a sending device does not have access to the network while in offline mode, the symmetric key will have to be encrypted with a public key that is stored on the device. Typically this is accomplished by having the sending device cache the public key certificates of potential intended recipients. In the case of handheld devices, the caching utilizes valuable storage that is often in short supply. Where there is a long distribution list for a message, for example, many recipients may be listed, this can require the sending unit, such as a small hand held device or other unit, to perform large amounts of processing and require large amounts of storage for the generation of the encrypted keys for each of the recipients.

Also, another known technique employs SSL (or other transport layer security schemes) to deliver sensitive email from a sender initially to a server. The sender typically authenticates to the server using a password and sends a message over the secure transport to a server. The server then sends an insecure notification email to one or more recipients, informing them that a message is available at the server. A recipient then supplies a password and downloads the message from the server, again using SSL or other secure transport for security. This scheme has the advantage that only browser software is required to send or receive email. However, the messages are typically only secured in transit. If the recipient retains a copy of the message, this scheme does not add security for the message copy. Similarly, if a message is composed offline pending a network connection, the sender holds an insecure copy of the message.

Accordingly, a need exists for an improved secure information apparatus and method.

BRIEF DESCRIPTION OF THE DRAWINGS

The present invention is illustrated by way of example and not limitation in the accompanying figures, in which like references indicate similar elements, and in which:

FIG. 3 is a flow chart illustrating one example of a method for securing information in accordance with one embodiment of the invention; and FIG. 4 is a flow chart illustrating one example of a method for securing information in accordance with one embodiment of the invention.

DETAILED DESCRIPTION OF THE PREFERRED EMBODIMENT

Figure 1:
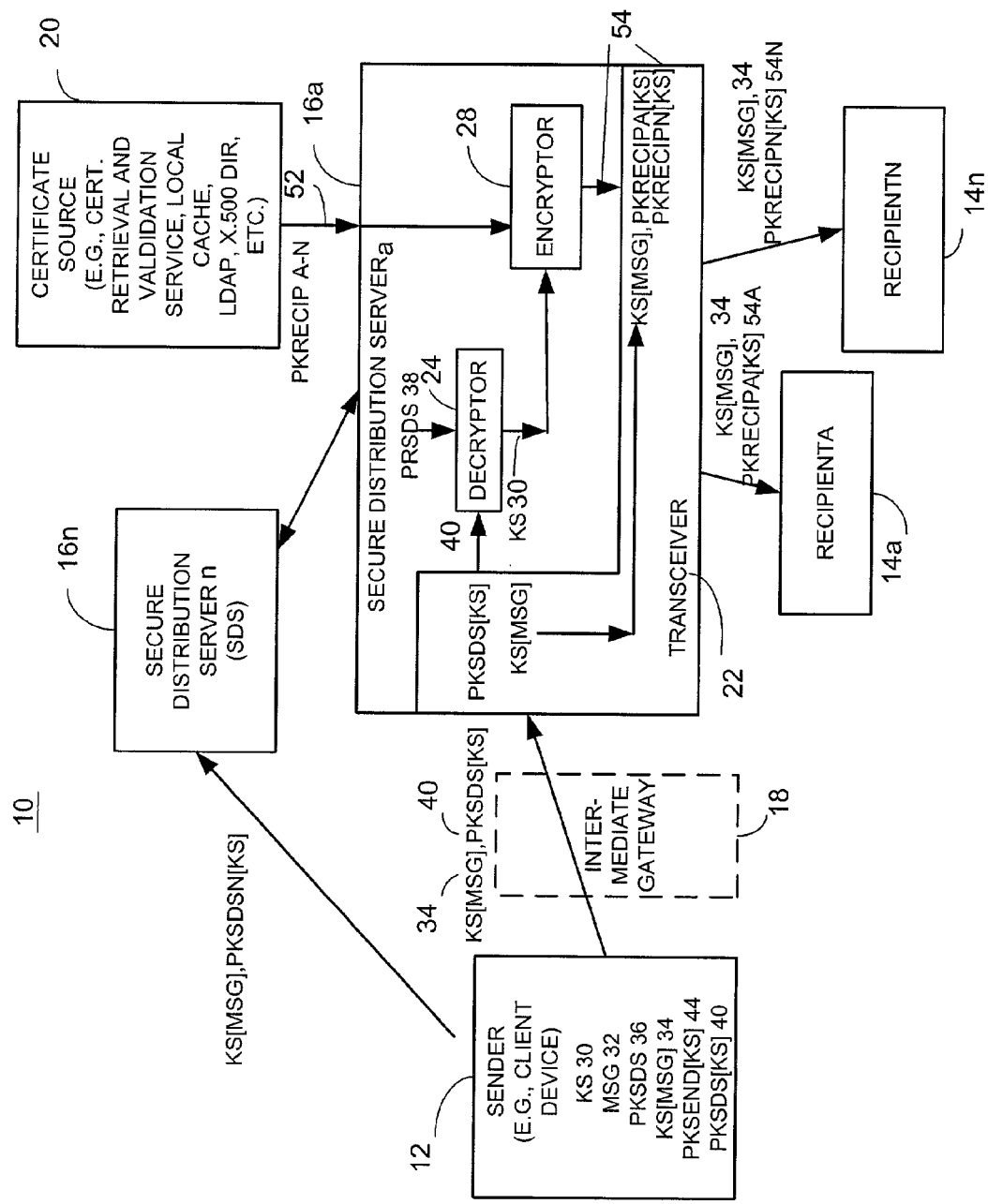
FIG. 1 is a block diagram illustrating one example of a secure communication system in accordance with one embodiment of the invention.

Briefly, a method and apparatus, such as a secure distribution server (SDS), receives encrypted information from a sender wherein the encrypted information is for transmission to a plurality of intended recipients. In addition to receiving the encrypted information, the method includes receiving an encrypted secret key that is encrypted using a public key associated with the secure distribution server. The method and apparatus decrypts the encrypted secret key to produce a decrypted secret key. The method and apparatus obtains corresponding public keys associated with at least one (or if desired, each) of the plurality of intended recipients (including using a same public key for a group of intended recipients) and then encrypts the decrypted secret key with the corresponding public key of at least one of the plurality of intended recipients to produce at least one recipient-specific secure secret key. Stated another way, the method and apparatus encrypts the decrypted secret key for one or more intended recipients using a corresponding public key to produce one or more recipient-specific secure secret keys. The method and apparatus then forwards the received encrypted information sent by the sender and also sends at least one recipient-specific secure secret key to a corresponding intended recipient.

As such, the information is encrypted before sending to the apparatus, such as a network element serving as a secure distribution server, and the secure distribution server maintains the information in encrypted form and forwards it to an intended recipient but only after encrypting the secret key for each intended recipient. Therefore, the sending unit need not perform the encryption of the secret key for many recipients, thereby improving the performance of the sending unit, reducing the amount of information that needs to be transmitted to the network, and allowing the information to be encrypted throughout the process. In addition, the information may be encrypted off line without the requirement for the caching of large numbers of intended recipient certificates and subsequently sent in encrypted form in an online session to the secure distribution server thereby facilitating an off line encryption process by the sending unit to provide additional flexibility. Other advantages will be recognized by those of ordinary skill in the art.

In addition, if desired, a method and apparatus, such as a sender, encrypts secret keys using a public key or public keys associated with each of a plurality of additional secure distribution servers where multiple distribution servers are employed. Each SDS may have its own public key pair or multiple SDS's may share a key pair. The method and apparatus also encrypts the secret key using a public key associated with any intended server or other entity. If desired, the sending unit may also apply a digital signature to the information. The secure distribution server may generate the encryption key pairs, such as a public encryption key and private decryption key on behalf of a recipient if desired. In an alternative embodiment, the method and apparatus may generate a copy of the decrypted secret key for each of the plurality of intended recipients and encrypt the copies of the decrypted secret keys with corresponding public keys associated with intended recipients.

FIG. 1 illustrates one example of a secure information system 10 that employs a sender 12 that sends encrypted information to one or more intended recipients 14a-14n through one or more network elements 16a-16n, such as secure distribution servers. The sender 12 may communicate with the network elements 16a-16n through an intermediate gateway 18. For example, where the information is e-mail, the intermediate gateway 18 may be an e-mail server and the network element 16a may be a Web service that is carried out by one or more servers that are in operative communication through the Internet or other suitable LAN or WAN. Alternatively, the network elements 16a-16n may be in an intranet. As used herein, the term "information" includes any information desired to be encrypted which may include, but is not limited to, e-mails, audio data, video data, documents such as HTML, PDF or any other information in any suitable format, data bases, or any contiguous collection of data, for example, any suitable information transported over any information transport protocol or any other suitable information.

The secure communication system 10 also includes a public key certificate source 20 such as a local cache of the network element 16a, an LDAP server, one or more X.500 directories, a certificate retrieval and validation service, such as a Web service, or any other source of public key certificates required by the network element 16a.

For purposes of illustration only, and not limitation, the invention will be described with reference to securing e-mail. However, it will be recognized that the invention is equally applicable to any other suitable information format and information transport protocol. The network element 16a includes a transceiver 22, a decryptor 24, and an encryptor 28. The network element 16a may be implemented as a server suitably coupled to one or more wide area networks or local area networks as desired. The transceiver 22 may be any suitable circuitry, such as hardware, software, firmware or any suitable combination thereof, that facilitates the receiving and sending of information to and from a sender and other entities. The network element 16a includes one or more processing devices, such as DSPs, microprocessors, microcomputers, ASIC's or any other suitable processing devices operably coupled to memory, such as RAM, ROM, distributed memory, registers, or any other suitable memory that in one embodiment contain executable instructions that when read by the one or more processing devices, causes the one or more processing devices to carry out the operations described herein. By way of example and not limitation, the decryptor 24 and the encryptor 28 are software modules that are executed by the network element. It will be recognized that these functions may be distributed to other network elements or any other entities as desired. In an alternative embodiment, the decryptor and encryptor may be discrete logic or any suitable combination of hardware, firmware and software and may include also, for example, state machines or any other suitable hardware, firmware or software combination as desired.

The sender 12 includes a suitable cryptographic engine to at least carry out conventional symmetric and asymmetric encryption and decryption. Likewise, each of the recipients include a cryptographic engine that carries out at least the decryption operation to suitably decrypt the encrypted information encrypted by the sender 12 and to decrypt the encrypted secret key. The sender may also forward the decrypted information to a time stamp device or may pass the decrypted information to a content scanner to detect desired content (e.g., virus', word searches etc.).

Alternatively, the SDS may contain the time stamper and/or content scanner and decrypts the encrypted information using the decrypted secret key before passing the decrypted information to the content scanner. Also, the SDS may encrypt the decrypted secret key using a public key associated with at least one of: a time stamp device and a content scanning device. The SDS may send the encrypted information and the encrypted secret key to at least one of the devices. The devices perform time stamping and/or content scanning on decrypted information and send a result back to the SDS. In the case of time stamping the encrypted information may be time stamped or decrypted information may be time stamped. The time stamp may be returned to the SDS. In the case of the content scanning, the SDS receives back from the content scanning device, the result of the scan, e.g., whether scanning detected a virus or whether the encrypted information can be forward to the intended recipient since no virus was detected, and forwards the encrypted information with the recipient specific encrypted secret key to an intended recipient. If the content scanning device determines that there is virus or other reason for not sending the encrypted information to an intended recipient, the content scanning device sends a message to the SDS indicating the same and the SDS notifies the sender or a third party that the encrypted information failed the content scan.

Figure 2:
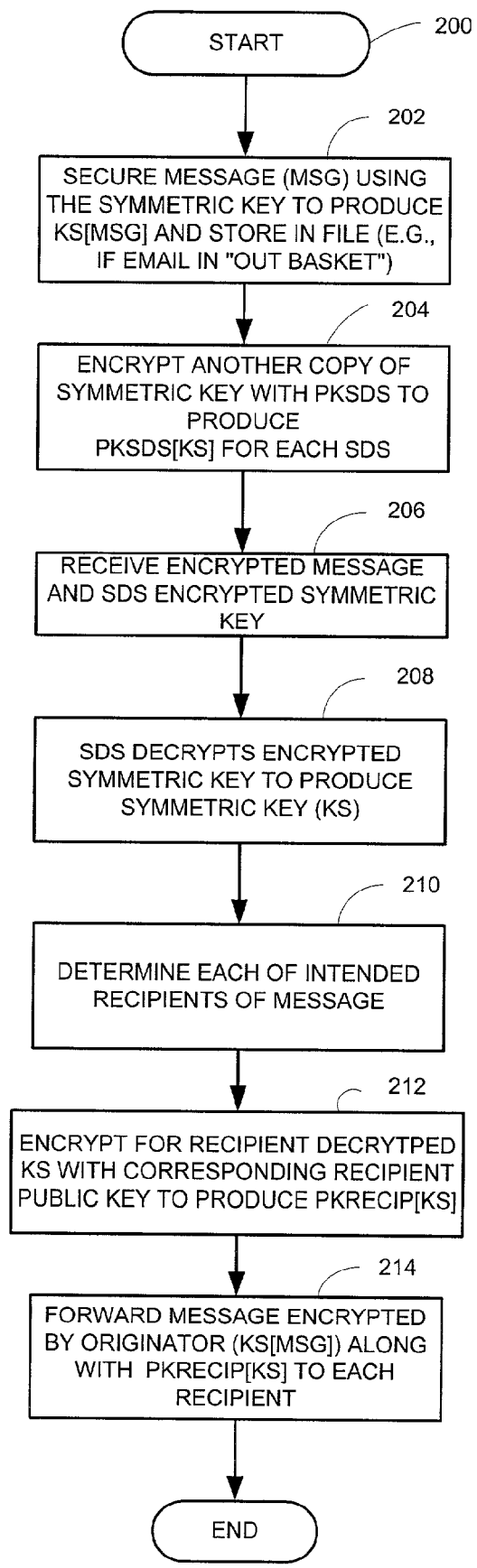
FIG. 2 is a flow chart illustrating one example of a method for securing information in accordance with one embodiment of the invention.

Referring to FIGS. 1 and 2, the operation of the secure communication system 10 will be described. As shown by block 200, to start the operation, the secure distribution server 16a either generates its own asymmetric key pair, such as a public key associated with the secure distribution server (PkSDS) 36 and a corresponding private key associated with the secure distribution server (PrSDS) 38 and the associated public key certificate or may obtain the asymmetric key pair from a suitable certificate issuing authority. When a user of the sender 12 signs up to use the service provided by the secure distribution server 16a, the secure distribution server 16a or other entity provides the public key associated with the secure distribution server (PkSDS) to the sender 12 or the sender pulls the information from a suitable location. As such, the sender 12 has a copy of the PkSDS 36 stored, for example, in a local cache to facilitate off line encryption of the secret key 30 for the secure distribution server or may obtain the public key 36 of the secure distribution server during an on line session if desired. A different secret key may be generated for each message.

As shown in block 202, the sender encrypts the desired information 32, in this example, an e-mail message, using conventional cryptographic techniques by encrypting the information (MSG) 32 with the secret key (KS) 30 (e.g., symmetric key) to produce the encrypted information (KS) [MSG] 34. Where the sender 12 includes, for example, a browser or other suitable application, the sender 12 may also store the encrypted information 34 to a local file such as the "out basket" of an e-mail program and as such stores a copy of the encrypted information 34 locally for later decryption by the sender 12 if desired. The sender 12 also generates the secret key that is used to generate the encrypted information.

As shown in block 204, the method includes the sender 12 encrypting the secret key 30 with a public key associated with the secure distribution server 16a, namely PkSDS 36 to produce an encrypted secret key PkSDS[KS] 40. This may be done for each secure distribution server 16a-16n or for any subset of such secure distribution servers. If desired, the sender also encrypts the secret key 30 with its own public key (PkSEND) and stores the sender encrypted secret key PkSEND[KS] 44 for later use to decrypt the secure information stored in the "out basket" as described above.

In this example, since the encrypted information 34 is an e-mail message, the recipients are designated as part of the message but are not typically encrypted. However, where non-email information is sent, the intended recipients 14a-14n may be designated in any suitable manner. Once the sender generates the encrypted information 34 and the encrypted secret key 40, the sender 12 sends the encrypted information 34 and the encrypted secret key 40 to the secure distribution server 16a. Where more than one secure distribution server is used by the sender in the system, the sender encrypts the secret key 30 using a public key for each of a plurality of secure distribution servers to produce a plurality of secure distribution server-specific encrypted secret keys. The sender may for example encrypt for each of the multiple SDS's or any subset of those servers, including only a single SDS. Each of the secure distribution servers or other entities are then sent their corresponding secure distribution server-specific encrypted secret keys along with the encrypted information 34.

As noted above, if desired, the secret key 30 may be encrypted by the sending device 12 with a public key associated with the sending device, or the user of the sender, to generate PkSEND (KS) 44. If desired, the sender 12 may also digitally sign the information 32 using a private signing key associated with the sending device 12, or the user of the sender. Accordingly, the SDS 16a or a recipient 14a-14n can also perform signature verification using a corresponding public verification key associated with the sender 12, or user of the sender, using conventional digital signature verification techniques.

As shown in block 206, the secure distribution server 16a receives the encrypted information 34 from the sender 12 for transmission to a plurality of intended recipients 14a-14n. The secure distribution server 16a also receives the encrypted secret key 40 that was encrypted using the public key 36 associated with the secure distribution server. As such, the sender 12 need only encrypt the secret key 30 for the secure distribution server and need not encrypt the secret key for any of the intended recipients.

As shown in block 208, the secure distribution server 16a decrypts the encrypted secret key 40, such as using decryptor 24, to produce a decrypted secret key 30. As shown in block 210, the secure distribution server analyzes recipient identification data (e.g., email addresses, etc.) associated with the encrypted information 34 to determine each of the intended recipients, such as by looking at the recipient ID or any other suitable information. The recipient identification data may or may not be encrypted.

As shown in block 212, the method includes encrypting by, for example, the secure distribution server using the encryptor 28, the decrypted secret key 30 with a corresponding public key 52 associated with at least one intended recipient to produce at least one recipient-specific secure secret key. In this example, the decrypted secret key 30 is encrypted with a corresponding public key 52 associated with each of the plurality of intended recipients 14a through 14n to produce a plurality of recipient-specific secure secret keys 54. This may be done by using the decrypted secret key 30 as an input to an encryption algorithm that also receives the corresponding public keys 52a-52n of the recipients (or public key associated with a group of recipients). The secure distribution server 16a may obtain the public keys for each intended recipient (including a group of recipients) through the certificate source 20 by obtaining the corresponding public keys from, for example, a certificate retrieval and validation service, an LDAP look up, a certificate directory look up, or any other suitable public key accessing technique. In the case of personal trust certificates, the sender sends personal trust certificates to the SDS or the SDS may capture incoming personal trust certificates as they are sent. Also, the SDS may request a recipient or sender to forward the personal trust certificate if it is not able to obtain it from its cache, or any other certificate source.

The encrypting by the SDS results in a plurality of wrapped symmetric keys. The decrypted secret key may be wrapped so that individual wrapped secret keys are generated for each recipient. Recipients may be sent only their respective wrapped key or may be sent the recipient specific secure secret keys for all (or a subset of) recipients of a message. The encrypting may also include using a public key associated with a group of recipients.

Alternatively, the secure distribution server 16a may generate a copy of the decrypted secret key for each of the plurality of intended recipients (or for one recipient) using a secret key copier, thereby producing a plurality of secret keys each associated with intended recipients and subsequently encrypting the decrypted secret key 30 with a corresponding public key 52a-52n associated with each of the plurality of intended recipients 14a through 14n to produce a plurality of recipient-specific secure secret keys 54a-54n.

As shown in block 214, once the secure distribution server produces the plurality of recipient-specific secure secret keys by encrypting the decrypted secret key using the associated public keys of each of the intended recipients, the secure distribution server 16a forwards, through the transceiver 22, the encrypted information 34, which has not itself been decrypted, and a recipient-specific secure secret key for each corresponding intended recipient. As such, the secure distribution server 16a sends the encrypted information 34 along with the recipient-specific secure secret key 54a to recipient 14a and forwards the encrypted information 34 along with the recipient-specific secure secret key 54n to recipient 14n. Also if desired, the encrypted information and all of the recipient-specific secure secret keys 54a-54n may be sent to all recipients and each recipient may select their own respective recipient-specific secure secret key.

Accordingly, the secure distribution server 16a does not encrypt the encrypted information and the sender 12 need not generate potentially thousands of encrypted secret keys for intended recipients. Since the sender 12 encrypts the encrypted information and sends it to the secure distribution server and since the secure distribution server then forwards the encrypted information to the recipient, the information is encrypted throughout the entire process. Moreover, the sender 12 may have a cryptographic engine that requires less complexity and the sender may require less storage capabilities using the aforedescribed process. Other advantages will be recognized by those having ordinary skill in the art.

It will be recognized that although the decryptor 24 decrypts the received encrypted secret key 40 that was encrypted using the public key associated with the network element to produce the decrypted secret key 30, the decryptor 24 may be located in another device. Therefore, as described herein, the network element may include one or more servers if desired. In addition, the secret key copier 26 that generates a copy of the decrypted secret key for each of the plurality of intended recipients associated with the encrypted information may also be in another device. However, it is desirable to include the decryptor, secret key copier and encryptor in one unit for security purposes and also to provide less complex signaling among differing units. As noted, the transceiver 22 forwards the encrypted information 34 sent by the sender 12 and at least one recipient-specific secure secret key 54 for a corresponding intended recipient.

Referring to FIG. 3, a method for securing information is shown from the perspective of the sender 12. As shown in block 300, the sender generates the symmetric key (KS) 30 on a per message or per session basis, for example, as shown in block 300 using conventional cryptographic techniques. The sender 12 then secures the information as previously described with respect to block 202 (FIG. 2). As shown in block 302, the sender 12 obtains the public key associated with the secure distribution server 16a or multiple SDS's, which as noted above, may be from a local cache, may be pushed or pulled from the secure distribution server or from any other suitable public key source. As shown in block 304, the sender 12 also obtains a copy of its own public key. As shown in block 306, if desired, the sender may encrypt the secret (e.g., symmetric) key with the public key associated with the sending device, or user of the sender, to produce PkSEND 44.

As shown in block 308, the sender 12 then sends the encrypted information 34 and the secure distribution server encrypted symmetric key 40 to the secure distribution server 16a or multiple SDS's. If desired, the sender 12 may also send the encrypted symmetric key 44 that is encrypted using the sender's public key. This may be desirable to allow for the recovery of the message later if it was archived.

FIG. 4 illustrates one example of a method for securing information from the perspective of the secure distribution server 16a. As shown, once the encrypted information 34 and the encrypted secret key 40 for the secure distribution server has been received, the method includes determining the type of information that was sent, the list of intended recipients and the information transport protocol over which the encrypted information is to be sent. For example, the secure distribution server 16a may determine whether the encrypted information 34 is an encrypted e-mail, FTP information, SMS or other form of information as indicated by designation information in the sent message or separately as desired. If desired, the sender may also program the SDS to indicate where and how to send the information, in which case the recipient information and the information transport protocol and the recipient list need not be sent with the message. This could be sent out of band or in several sequential messages. This is shown in block 400. The method then includes the secure distribution server decrypting its copy of the encrypted symmetric key 34 to produce the symmetric key 30 (i.e., the decrypted secret key) and determining each of the intended recipients 14a-14n of the information to make copies of the symmetric key for each intended recipient. As shown in block 402, the method includes retrieving the encryption public key for each intended recipient from a suitable certificate or multiple certificate sources. This may be done by a certificate retrieval program or other suitable software or hardware as desired. The method then includes the operations as described above.

From a system perspective, the sender may encrypt the information with the secret key to produce the encrypted information 34 and also during an off-line mode may encrypt the secret key with the public key associated with the secure distribution server(s) to generate the encrypted secret key 40 or keys. Subsequently during an on-line session, the client may then send the encrypted information 34 and any encrypted secret key(s) 40 to the secure distribution server(s) to facilitate a more flexible secure information communication approach.

It will be recognized that although steps have been described with reference to a particular order, any suitable order of operations may be carried out. Moreover, the operations as noted may be carried out by any suitable devices as desired.

As another advantage, only a small header, in the case of e-mails, or other information sent with header information, is employed since the sender only encrypts the secret key for itself (if desired) and for a small number of secure distribution servers. This can be very desirable for hand held devices or other processing limited devices or devices that connect to the network using a limited bandwidth link.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for securing information comprising
receiving encrypted information from a sender for transmission to at least one intended recipient, receiving information indicating a transfer protocol to use when sending the encrypted information to the at least one intended recipient, and receiving an encrypted secret key encrypted using a secure distribution server specific public key of a public/private key pair specific to the secure distribution server;
decrypting the encrypted secret key to produce a decrypted secret key;
obtaining a corresponding public key of the at least one intended recipient;
encrypting the decrypted secret key for the at least one intended recipient using a corresponding public key specific to the at least one intended recipient to produce at least one recipient specific secure secret key; and
forwarding, according to the information indicating the transfer protocol, the encrypted information sent by the sender and at least one recipient specific secure key to the at least one intended recipient.

2. The method of claim 1 including determining a plurality of intended recipients and retrieving corresponding public keys of the plurality of intended recipients for encrypting the decrypted secret key.

3. The method of claim 1 wherein the step of encrypting the decrypted secret key with a corresponding public key of the at least one intended recipient includes encrypting a copy of the decrypted secret key for each intended recipient with a corresponding recipient public key.

4. The method of claim 1 including the steps of: encrypting information with the secret key to produce the encrypted information, encrypting the secret key with the secure distribution server specific public key of the secure distribution sewer to produce the encrypted secret key, and sending the encrypted information and the encrypted secret key to the secure distribution server.

5. The method of claim 4 wherein encrypting the secret key includes encrypting the secret key using a public key for each of a plurality of secure distribution servers to produce a plurality of secure distribution sewer specific encrypted secret keys.

6. The method of claim 4 including storing the encrypted information in an encrypted form locally on a device that performed the step of encrypting information with the secret key.

7. The method of claim 4 further including the step of encrypting the secret key, by a sending device, with a public key associated with at least one of a user of the sending device and the sending device.

8. The method of claim 4 including the step of digitally signing the information using a private signing key associated with at least one of a user of a sending device and the sending device.

9. The method of claim 1 further including the step of receiving the encrypted information and the encrypted secret key and forwarding the encrypted information and the encrypted secret key to the secure distribution sewer without decrypting the encrypted secret key.

10. The method of claim 1 including the step of determining, by the secure distribution sewer, if the encrypted information needs to be sent to other entities, if so, encrypting the decrypted secret key using a public key associated with each of the additional entities.

11. The method of claim 1 including the steps of: encrypting the decrypted secret key using a public key associated with a content scanning device; sending the encrypted information and the encrypted secret key to the content scanning device; receiving a result back from the content scanning device, forwarding the encrypted information based on the result sent by the content scanning device and based on at least one recipient specific secure secret key for at least one intended recipient.

12. The method of claim 2 wherein retrieving the corresponding public keys of the plurality of intended recipients for encrypting the decrypted secret key includes obtaining the corresponding public keys from at least one of: a certificate retrieval and validation service, an LDAP lookup and a certificate directory lookup.

13. The method of claim 1 including the steps of: encrypting information with a secret key to produce the encrypted information offline, encrypting the secret key with the non-group public key associated with the secure distribution server to produce the encrypted secret key offline, and during an online session, sending the encrypted information and the encrypted secret key to the secure distribution server.

14. The method of claim 1 including sending the encrypted information to a time stamper and receiving a time stamped result prior to forwarding the encrypted information and the at least one recipient specific secure secret key for the at least one corresponding intended recipient.

15. A method for securing information comprising:
receiving, by a secure distribution server, encrypted information for transmission to a plurality of intended recipients, receiving information indicating a transfer protocol to use when sending the encrypted information to the at least one intended recipient, and receiving an encrypted secret key encrypted using a secure distribution server specific public key of a public/private key pair specific to the secure distribution server;
decrypting, by the secure distribution server, the encrypted secret key to produce a decrypted secret key;
obtaining, by the secure distribution server, a corresponding public key of at least one intended recipient;
encrypting, by the secure distribution server, the decrypted secret key for the at least one intended recipient using a corresponding public key specific to the at least one intended recipient to produce a recipient specific secret key; and
forwarding, by the secure distribution server, according to the information indicating the transfer protocol, the encrypted information and the recipient specific secure secret key to a corresponding intended recipient.

16. The method of claim 15 including determining a plurality of intended recipients and retrieving corresponding public keys of the plurality of intended recipients for encrypting the secret key.

17. The method of claim 16 wherein the step of encrypting includes encrypting a copy of the decrypted secret key for each intended recipient with a corresponding recipient public key.

18. A network element comprising:
one or more processing devices operative to:
decrypt a received encrypted secret key encrypted using a secure distribution server specific public key of a public/private key pair specific to the secure distribution server corresponding to the network element to produce a decrypted secret key;
obtaining a corresponding public key of at least one intended recipient;
encrypt the decrypted secret key for the at least one intended recipient using a corresponding public key specific to the at least one intended recipient to produce a recipient specific secure secret key; and
forward, to the at least one intended recipient, the encrypted information sent by a sender, according to information specified by the sender which indicates a transfer protocol to use when sending the encrypted information, and at least one recipient specific secure secret key to the at least one intended recipient.

19. The network element of claim 18 wherein the one or more processing devices retrieves the corresponding public keys specific to the at least one intended recipient of a plurality of intended recipients for encrypting the decrypted secret key from at least one of: a certificate retrieval and validation service, an LDAP lookup and a certificate directory lookup.

20. A storage medium comprising:
memory containing executable instructions that when read by one or more processing devices, causes the one or more processing devices to:
receive encrypted information from a sender for transmission to at least one intended recipient, receive information indicating a transfer protocol to use when sending the encrypted information to the at least one intended recipient, and receive an encrypted secret key encrypted using a secure distribution server specific public key of a public/private key pair specific to the secure distribution server;
decrypt the encrypted secret key to produce a decrypted secret key;
obtained a corresponding public key of the at least one intended recipient specific to the at least one intended recipient;
encrypt the decrypted secret key for the at least one intended recipient using the corresponding public key to produce a recipient specific secure secret key; and
forward, according to the information indicating the transfer protocol, the encrypted information sent by the sender and the at least one recipient specific secure key to the at least one intended recipient.

21. The storage medium of claim 20 including memory containing executable instructions that when read by the one or more processing devices causes the one or more processing devices to:
determine a plurality of intended recipients and retrieve corresponding public keys of the plurality of intended recipients for encrypting the decrypted secret key.

22. The storage medium of claim 20 including memory containing executable instructions that when read by the one or more processing devices causes the one or more processing devices to encrypt a copy of the decrypted secret key for each intended recipient with a corresponding recipient public key.

23. The storage medium of claim 20 including memory containing executable instructions that when read by the one or more processing devices causes the one or more processing devices to determine if the encrypted information needs to be sent to other entities, if so, encrypting the decrypted secret key using a public key associated with each of the other entities.

24. A secure communication system comprising:
at least one sender that encrypts information with a secret key to produce encrypted information, encrypts the secret key with a secure distribution sever specific public key of a public/private key pair specific to the secure distribution server associated with a network element to produce an encrypted secret key, and during an online session, sends the encrypted information and the encrypted secret key to the network element;
at least one intended recipient;
at least one network element, operatively coupled to the sender and to the at lest one intended recipient, including:
one or more processing devices operative to:
decrypt a received encrypted secret key encrypted using a secure distribution server specific public key of a public/private key pair specific to the secure distribution server corresponding to the network element to produce a decrypted secret key;
obtaining a corresponding public key of at least one intended recipient;
encrypt the decrypted secret key for the at least one intended recipient using a corresponding public key specific to the at least one intended recipient to produce a recipient specific secure secret key; and
forward, to the at least one intended recipient, the encrypted information sent by a sender, according to information specified by the sender which indicates a transfer protocol to use when sending the encrypted information and at least one recipient specific secure secret key to the at least one intended recipient.

25. The system of claim 24 wherein a sender encrypts information with the secret key to produce the encrypted information offline, encrypts the secret key with a public key associated with the network element to produce the encrypted secret key offline, and during an online session, sends the encrypted information and the encrypted secret key to the network element.

26. The system of claim 24 wherein the network element retrieves corresponding public keys of a plurality of intended recipients for encrypting the decrypted secret key from at least one of: a certificate retrieval and validation service, an LDAP lookup and a certificate directory lookup.

27. The system of claim 24 wherein the network element encrypts the decrypted secret key using the secure distribution server specific public key associated with a content scanning device; sends the encrypted information and sends the encrypted secret key to the content scanning device; receives a result back from the content scanning device, and forwards the encrypted information based on the result sent by the content scanning device and based on at least one recipient specific secure secret key for at least one intended recipient.

* * * * *